United States Patent Office 2,734,899
Patented Feb. 14, 1956

2,734,899

MANUFACTURE OF BROMINATED STEROID COMPOUNDS

Thomas Leigh, Blackley, England, assignor to Imperial Chemical Industries Limited, a corporation of Great Britain No Drawing. Application September 10, 1953, Serial No. 379,471

Claims priority, application Great Britain September 19, 1952

8 Claims. (Cl. 260—239.55)

This invention concerns improvements in or relating to the manufacture of α-bromoketones of the steroid series.

According to the invention I provide an improved process for the manufacture of steroid compounds containing the group:

—CO—CH—Br— by bromination of the corresponding steroid compound containing the group

—CO—CH₂— characterised in that bromination is effected by means of dioxan perbromide.

The reaction is conveniently carried out in a solvent which may be for example dioxan in which case the dioxan perbromide may be made in an excess of this solvent and used without isolation.

The process of my invention represents a marked improvement over the known process for the manufacture of the said α-bromoketones in that the reaction proceeds more readily, isolation is less difficult and the yields of the product are higher.

The invention is illustrated but not limited by the following examples, in which the parts are by weight:

Example 1

0.79 part of bromine is added to 8 parts of dioxan and the mixture is added to a solution of 2 parts of methyl 3-(α)-acetoxy-12-ketocholanate in 15 parts of dioxan. The mixture is heated at 45° C. for 10 minutes and is then poured into 250 parts of ice water. The mixture is filtered and the residue is washed with water and dried in vacuo. There is obtained in quantitative yield a mixture of methyl 3(α)-acetoxy-12-keto-11(α)-bromocholanate and methyl 3(α)-acetoxy-12-keto-11(β)-bromocholanate.

Example 2

1.64 parts of bromine are added to 15 parts of dioxan and the solution is added to a mixture of 2.36 parts of hecogenin acetate in 20 parts of dioxan. The mixture is stirred at 25° C. for 5 minutes and is then poured into 300 parts of ice water. The mixture is filtered and the solid residue is washed with water and dried in vacuo. It is then crystallised from a mixture of methyl alcohol and diethyl ether and 2.6 parts of 11:23-dibromohecogenin acetate of M. P. 170° C. are obtained.

Example 3

0.053 part of bromine is added to 1 part of dioxan and the mixture is added to a solution of 0.117 part of 3(α)-acetoxy-17(α)-hydroxy-11:20-diketopregnane. The mixture is heated at 45° C. for 3 minutes and is then poured into 10 parts of ice water. The mixture is filtered and the solid residue is washed with water and dried in vacuo. There is obtained in quantitative yield 3(α) - acetoxy - 17(α) - hydroxy - 11:20 - diketo - 21-bromopregnane.

Example 4

0.165 part of bromine is added to 2 parts of dioxan and the solution is added to a solution of 0.386 part of cholestan-3-one in 2 parts of dioxan at 25° C. The mixture is then poured into 20 parts of ice water, and the product is isolated as is described in Example 3. There is obtained in quantitative yield 2-bromocholestan-3-one.

What I claim is:

1. A process for the manufacture of α-bromoketones of the steroid series which comprises brominating a keto-steroid selected from the group consisting of methyl 3(α)-acetoxy-12-ketocholanate, hecogenin acetate, 3(α)-acetoxy-17(α)-hydroxy-11:20-diketopregnane and cholestan-3-one with dioxan perbromide.

2. A process as recited in claim 1 in which the bromination reaction is performed in a solvent.

3. A process as recited in claim 2 in which the said solvent is dioxan.

4. A process as recited in claim 3 in which bromine is added to dioxan and the mixture so produced is added to a mixture of said keto-steroid compound and dioxan.

5. A process as recited in claim 1 in which said keto-steroid compound is 3-(α)-acetoxy-12-ketocholanate.

6. A process as recited in claim 1 in which said keto-steroid compound is hecogenin acetate.

7. A process as recited in claim 1 in which said keto-steroid compound is 3-(α)-acetoxy-17-(α)-hydroxy-11:20-diketo-pregnane.

8. A process as recited in claim 1 in which said keto-steroid compound cholestan-3-one.

References Cited in the file of this patent

UNITED STATES PATENTS

| | | |
|---|---|---|
| 2,340,388 | Inhoffen | Feb. 1, 1944 |
| 2,369,065 | Marker | Feb. 6, 1945 |
| 2,397,656 | Gallagher | Apr. 2, 1946 |
| 2,461,563 | Miescher | Feb. 15, 1949 |
| 2,590,978 | Kendall | Apr. 1, 1952 |